United States Patent [19]

Goddijn, deceased et al.

[11] Patent Number: 4,546,305
[45] Date of Patent: Oct. 8, 1985

[54] MAINS-VOLTAGE DISCRIMINATION DEVICE

[75] Inventors: Bernardus H. A. Goddijn, deceased, late of Drachten, Netherlands; by Friedrich J. de Haan, administrator, Dommelen, Netherlands

[73] Assignee: U.S. Philips Corporation, New York, N.Y.

[21] Appl. No.: 508,960

[22] Filed: Jun. 29, 1983

[30] Foreign Application Priority Data

Jul. 2, 1982 [NL] Netherlands ............... 8202666

[51] Int. Cl.$^4$ ............................................. G05F 5/00
[52] U.S. Cl. .................................. 323/299; 363/126; 363/143; 323/370
[58] Field of Search ............... 363/142, 143, 126; 323/299, 300, 301, 366, 369, 908, 370; 337/120, 340, 364, 377; 307/130, 446, 491, 132 T; 338/23, 48; 361/103, 162, 165

[56] References Cited

U.S. PATENT DOCUMENTS

| 3,241,026 | 3/1982 | Andrich | 323/369 |
| 3,686,517 | 8/1972 | Sexton, Jr. | 323/369 |
| 4,349,726 | 9/1982 | Gössler | 337/102 |
| 4,357,525 | 11/1982 | Jenne | 337/102 |

FOREIGN PATENT DOCUMENTS

| 2801462 | 7/1979 | Fed. Rep. of Germany | 307/130 |
| 2838716 | 3/1980 | Fed. Rep. of Germany | 363/142 |

Primary Examiner—Peter S. Wong
Assistant Examiner—Judson H. Jones
Attorney, Agent, or Firm—Robert T. Mayer; Bernard Franzblau

[57] ABSTRACT

A supply-voltage discrimination device for adapting a load (8) to a lower or higher alternating-voltage range includes a voltage-dependent resistor (1) thermally coupled to a PTC-resistor (2) and electrically connected in series with said voltage-dependent resistor. The resistors are chosen so that initially the dissipation is mainly determined by the voltage-dependent resistor.

20 Claims, 6 Drawing Figures

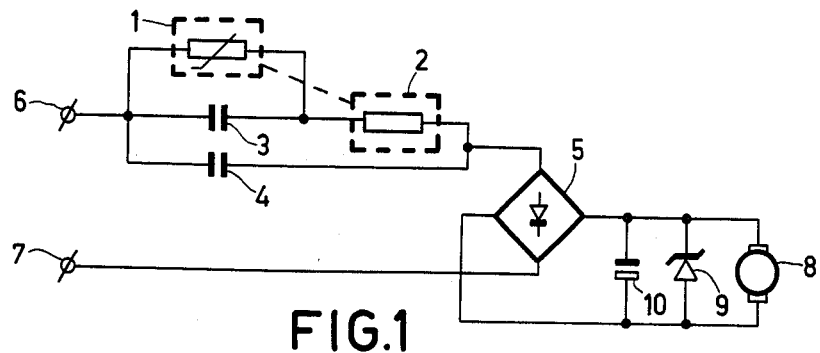
FIG.1
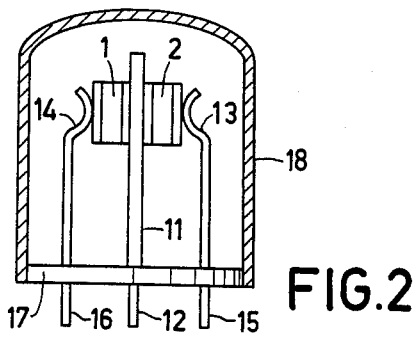
FIG.2
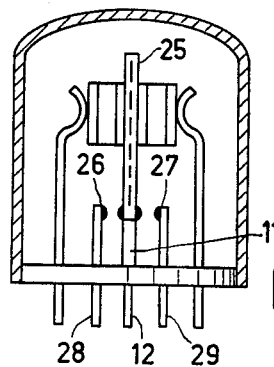
FIG.5
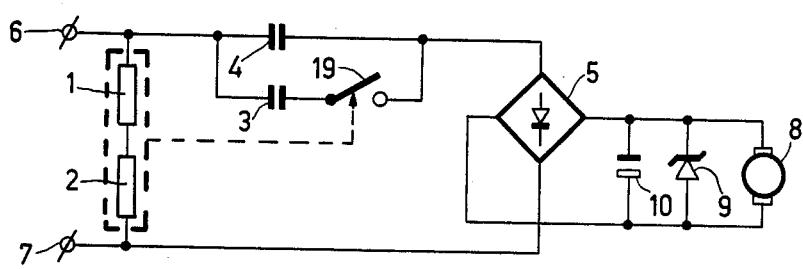
FIG.3
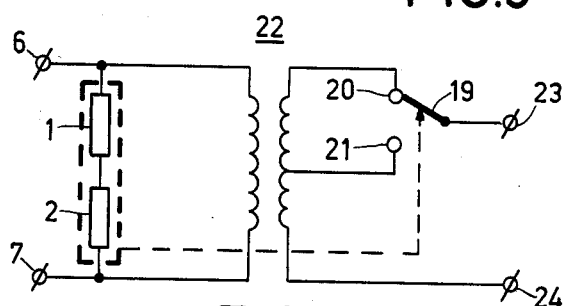
FIG.4
FIG.6

MAINS-VOLTAGE DISCRIMINATION DEVICE

This invention relates to a mains-voltage discrimination device for adapting a load to a lower or a higher alternating-voltage range, which device comprises a resistor with a positive temperature coefficient (PTC-resistor) arranged in series with a voltage-dependent resistor with such a resistance and disposed in such a way that its resistance in the upper alternating-voltage range is lower than in the lower alternating-voltage range.

Such a device is known from German Patent Application No. 2838716 which has been laid open to public inspection and may be used, for example, for adapting an a.c. motor, in particular a motor of a shaving apparatus, automatically to mains voltages of, for example, 110 or 220 V. In this known device the PTC-resistor is connected in series with the motor across the mains voltage input. An impedance, specifically a capacitance, is arranged in parallel with this PTC-resistor. For a low mains voltage of 110 V the PTC-resistor has a low impedance and the a.c. motor is connected in parallel with the mains-voltage input. For a higher alternating voltage of 220 V the motor will draw more current so that, owing to the dissipation in the PTC-resistor, the temperature and thus the impedance of this resistor will increase. As a result the capacitance is connected in series with the motor and thus takes up a part of the higher alternating voltage of 220 V. In order to render the current which flows through the PTC-resistor for an alternating voltage of 220 V less dependent on the current consumed by the motor at this voltage, a voltage-dependent resistor is arranged in parallel with the motor and consequently in series with the PTC-resistor. The voltage-dependent resistor has the characteristic that its impedance drops to a low value for an input voltage of 220 V, so that an additional current flows through the PTC-resistor causing the temperature of this resistor to rise regardless of the actual current consumption of the motor.

If allowance is made for a possible spread of + or −10% of the supply voltage of 110 and 220 V, an increase of the current through the capacitor by 20% if the mains frequency is 60 Hz instead of 50 Hz, the fact that the 120 V may have a frequency of 50 or 60 Hz whereas the 220 V has a frequency of 50 Hz only, and the 10% possible spread of the capacitor value, the PTC should change over between the limits 168 V and 176 V. If moreover, allowance is made for the possible spread of the PTC-resistor properties and the influence of the ambient temperature, it is found that in practice correct operation cannot be guaranteed when a PTC-resistor is used. Moreover, if a PTC resistor adapted to such a narrow voltage range is used, the switching time will become very long.

It is an object of the invention to provide a mains-voltage discrimination device of the type set forth in the opening paragraph which enables switching between the said limits to occur within acceptable switching times. To this end the invention is characterized in that the PTC-resistor and the voltage-dependent resistor are such that in the upper alternating-voltage range at least initially, the voltage-dependent resistor dissipates more power than the PTC-resistor and both resistors are in close thermal contact with each other, so that initially the temperature of the PTC-resistor is determined mainly by the dissipation in the voltage-dependent resistor.

With an appropriate choice of VDR, if the supply voltage now becomes 220 V instead of 110 V the impedance of the voltage-dependent resistor becomes low and this resistor heats itself. The temperature of the PTC-resistor increases also as a result of the thermal coupling. The resistance value of this PTC-resistor then increases and limits the current through the voltage-dependent resistor. As a result of the increased resistance the dissipation in the PTC-resistor can increase, so that in the final condition the voltage-dependent resistor has a low dissipation and the PTC-resistor remains warm mainly as a result of its own dissipation, regardless of the dimensioning of the circuit. The series arrangement of the two resistors then remains set to a point at a specific temperature. In this way the various values of the mains voltage are discriminated between by the voltage-dependent resistor itself, which has a far more accurate change-over point than the gradually changing PTC-resistor. The PTC-resistor limits the current through the voltage-dependent resistor so that it is not destroyed. The ambient temperature still influences the PTC-resistor, but because the voltage-dependent resistor dissipates a comparatively high power, for example a few tens of watts, this no longer has any effect on the changeover point. Indeed, in a device in accordance with the invention discrimination is effected at a voltage which is dictated by the change-over voltage of the voltage-dependent resistor and not at a specific temperature. In the known device discrimination is effected at a specific temperature of the PTC-resistor, i.e. not at a specific voltage, which temperature is caused by a voltage increase above a specific limit.

A mains-voltage discrimination device in accordance with the invention may be further characterized in that a first voltage-dropping impedance is connected in parallel with the voltage-dependent resistor and in series with the PTC-resistor, a second voltage-dropping impedance is connected in parallel with the series arrangement of the PTC resistor and the first voltage-dropping impedance, and the load is arranged in series with this parallel arrangement.

If this is the case the PTC-resistor itself provides the change-over of the load. If the PTC-resistor is cold, the two voltage-dropping impedances in parallel are arranged in series with the motor, and if the PTC-resistor is warm only the second voltage-dropping impedance is connected in series with the motor, so that at a higher voltage a higher voltage-dropping impedance is obtained.

As an alternative a mains-voltage discrimination device in accordance with the invention may be further characterized in that a thermally actuated switch is in close thermal contact with the voltage-dependent resistor in order to adapt the load from one alternating-voltage range to another.

In this voltage-discrimination device the load is switched over by means of a switch which is actuated in response to a temperature increase of the voltage-dependent resistor and the PTC-resistor, said PTC-resistor acting solely as a limiter for the current through the voltage-dependent resistor and, in the steady state after changeover, as a dissipating element.

This mains-voltage discrimination device may further be characterized in that the series arrangement of the voltage-dependent resistor and the PTC-resistor is arranged in parallel with the mains voltage input.

A further characteristic feature of this device may be tht the thermally actuated switch is equipped with a bimetal strip.

A preferred form of this last-mentioned mains-voltage discrimination device is characterized in that the voltage-dependent resistor and the PTC-resistor are arranged one on each side of a metal support on which the bimetal strip is arranged.

A further characteristic feature of a mains-voltage discrimination device in accordance with the invention may be that the voltage-dependent resistor comprises an element, in particular a zener diode, which becomes highly conductive above a specific voltage, which element is arranged in series with a resistor.

The invention will now be described in more detail, by way of example, with reference to the drawing, in which:

FIG. 1 shows a first embodiment in the form of a mains-voltage discrimination device in which the PTC-resistor itself adapts the load to the mains-voltage range, FIG. 2 shows how a voltage-dependent resistor may be maintained in close thermal contact with a PTC-resistor in a device as shown in FIG. 1, FIG. 3 shows a second embodiment in the form of a mains-voltage discrimination device which adapts the load via a switch, FIG. 4 shows a further embodiment of the invention comprising a centre-tapped transformer, FIG. 5 shows how a PTC-resistor, a voltage-dependent resistor and a bimetal strip may be thermally coupled together for use in the circuit arrangement shown in FIGS. 3 and 4, and FIG. 6 shows an example of a voltage-dependent resistor used in the device as shown in FIGS. 1, 3 or 4.

FIG. 1 shows a mains-voltage discrimination device in accordance with the invention, in particular for adapting an a.c. load with a comparatively low power consumption, such as a shaving apparatus. The device comprises a voltage-dependent resistor 1 which is arranged in series with a PTC-resistor 2. A voltage-dropping capacitor 3 is arranged in parallel with the voltage-dependent resistor 1. A voltage-dropping capacitor 4 is arranged in parallel with the series arrangement of the voltage-dropping capacitor 3 and the PTC-resistor 2. This entire arrangement is connected in series with a rectifier-diode bridge 5 between terminals 6 and 7 of an a.c. input voltage. The output of the diode-rectifier bridge 5 is connected to a motor 8. A smoothing capacitor 10 and a voltage-stabilizing zener diode 9 are arranged in parallel with the motor 8. As is indicated by the broken lines in FIG. 1, the voltage-dependent resistor 1 is thermally coupled to the PTC-resistor 2. At an input voltage of approximately 120 V the voltage-dependent resistor has a high impedance and does not become warm. The value of the PTC-resistor 2 is selected so that it never heats itself. If the voltage-dependent resistor has a high impedance and the PTC-resistor consequently has a low impedance, the capacitors 3 and 4 in parallel are in series with the load and consequently dissipate a part of the alternating voltage applied to the input terminals 6 and 7.

The voltage-dependent resistor has been selected so that when the supply voltage at inputs 6 and 7 is higher than 170 V the resistance of the voltage-dependent resistor decreases substantially and the voltage-dependent resistor heats itself and dissipates heat to the PTC-resistor. This PTC-resistor then rapidly reaches the temperature at which its resistance increases substantially and thereby limits the current through the voltage-dependent resistor. As a result of the limitation of the current the dissipation in the voltage-dependent resistor decreases. However, the increased resistance of the PTC-resistor causes the dissipation in this PTC-resistor to increase so that the lastmentioned resistor remains warm. Since at this higher input alternating voltage the resistance of the PTC-resistor 2 has become high, only capacitor 4 is connected in series with the load at this input alternating voltage. Thus, at the higher input alternating voltage a higher impedance is connected in series with the load and a larger part of the input alternating voltage is dropped across the voltage-dropping impedance. The current through the voltage-dependent resistor is 90° out of phase with the current through the capacitor 3. As a result, the additional current through the voltage-dependent resistor 1 only has a slight influence on the total current through the circuit. By suitably dimensioning the various components the switching time can be limited to a few seconds. A short switching time is necessary because the higher initial current produces a higher dissipation in the zener diode 9, which higher dissipation must be accommodated by the thermal capacity of the zener diode.

FIG. 2 shows the voltage-dependent resistor 1 and the PTC-resistor 2 of the circuit shown in FIG. 1 arranged in close thermal contact. The two resistors 1 and 2 are disc-shaped and have metal contact faces at their ends. They are arranged one on each side of a metal body 11, against which they are urged by resilient elements 13 and 14. The body 11 and the resilient elements 13 and 14 are connected to connecting pins 12, 15 and 16 respectively via a bottom plate 17. The assembly is acommmodated in a housing 18.

FIG. 3 shows a supply-voltage discrimination device in accordance with the invention which, in contradistinction to the device shown in FIG. 1, does not change over the load by means of the PTC-resistor 2 itself. The voltage-dependent resistor 1 and the PTC-resistor 2 are arranged in series between the terminals 6 and 7 of the input alternating voltage. Between these alterating voltage terminals they function in the same way as in the circuit arrangement shown in FIG. 1, their resistance values and the voltage value at which the voltage-dependent resistor becomes more conductive are adapted to the present situation. At an input alternating voltage higher than 170 V the voltage-dependent resistor 1 becomes conductive so that it becomes warm. As a result of the thermal coupling to the PTC-resistor the last-mentioned resistor will also become warm and thereby limit the current through the voltage-dependent resistor. For the purpose of the mains-voltage discrimination a switch 19 is used which responds to the increase in temperature of the voltage-dependent resistor 1 or the PTC-resistor 2, which is symbolically represented by a broken line in FIG. 3. As is shown in FIG. 3, this embodiment connects the voltage-dropping capacitor 3 in parallel with the voltage-dropping capacitor 4 by means of the switch 19. Otherwise, the circuit arrangement corresponds to that shown in FIG. 1. For voltages below 170 V the voltage-dependent resistor 1 remains cold so that the switch is closed and the capacitor 3 is in parallel with the capacitor 4 and both are in series with the load. For voltages higher than 170 V capacitor 3 is disconnected by means of the switch 19 and subsequently only capacitor 4 is arranged in series with the load.

Instead of disconnecting a parallel voltage-dropping impedance, as in the device shown in FIG. 3, it is of course alternatively possible, in response to the mains voltage discrimination by means of the voltage-dependent resistor 1 and the PTC resistor 2, to short-circuit a voltage-dropping impedance in the lower alternating voltage range and to eliminate this short-circuit for input voltages higher than 170 V.

FIG. 4 shows a different mains-voltage discrimination device in accordance with the invention. In the same way as in the arrangement shown in FIG. 3, it comprises a voltage-dependent resistor 1 in series with a PTC-resistor 2 arranged between the power-supply terminals 6 and 7. A switch 19 is thermally coupled to these resistors. Unlike the circuit arrangement shown in FIG. 3, the arrangement shown in FIG. 4 selects one of two secondary connections 20 and 21 of a supply voltage transformer 22 by means of the switch 19. The position of the switch 19 therefore determines which of the taps 20 and 21 leads to the outputs 23, 24 of the circuit shown in FIG. 4. When the various components are chosen correctly the voltage on outputs 23, 24 at an input alternating voltgage of 120 V is equal to the voltage on said outputs at an input alternating voltage of 220 V.

Preferably a bimetal switch is employed for the switch 19 shown in FIGS. 3 and 4. FIG. 5 shows how the voltage-dependent resistor 1 and the PTC resistor 2 are then combined with such a switch. For this purpose the metal body 11 between the two resistors is provided with a bimetal strip 25. This bimetal strip 25 is arranged between two contacts 26 and 27 which are connected to connecting pins 28 and 29 respectively. Thus, depending on the temperature of the voltage-dependent resistor, the contact 12 which is connected to the metal centre plate 11 is connected to connecting pin 28 or 29.

Although the bimetal switch of FIG. 5 functions as a change-over switch with a master contact 12 and two secondary contacts 28 and 29, it is obvious that this switch may alternatively be a make or break switch.

FIG. 6 shows a method of forming a voltage-dependent resistor by means of a zener diode 30. This zener diode 30 is arranged in series with a diode 31 in order to block current flow in a direction other than the direction in which the zener diode 30 exhibits the zener effect. Since the zener diode has a very low impedance when conductive a resistor 32 is included in this series arrangement. When the zener diode 30 is turned on the resistance of the series arrangement is determined by the resistor 32.

The embodiments of the invention in which an exclusive property or privilege is claimed are defined as follows:

1. A mains-voltage discrimination device for adapting a load to a lower or an upper alternating voltage range, comprising a resistor with a positive temperature coefficient (PTC-resistor) connected in series with a voltage-dependent resistor having such a resistance and disposed in such a way that its resistance in the upper alternating-voltgage range is lower than in the lower alternating-voltage range, characterized in that the PTC-resistor and the voltage-dependent resistor have characteristics such that in the upper alternating-voltage range, at least initially, the voltage-dependent resistor dissipates more power than the PTC-resistor, and both resistors are in close thermal contact with each other so that initially the temperature of the PTC-resistor is determined mainly by the dissipation in the voltage-dependent resistor.

2. A discrimination device as claimed in claim 1, further comprising a first voltage-dropping impedance connected in parallel with the voltage-dependent resistor and in series with the PTC-resistor, a second voltage-dropping impedance arranged in parallel with the series arrangement of the PTC-resistor and the first voltage-dropping impedance, and wherein the load is coupled in series with said parallel arrangement.

3. A discrimination device as claimed in claim 1, further comprising a thermally actuated switch in close thermal contact with the voltage-dependent resistor in order to adapt the load from one alternating-voltage range to another.

4. A discrimination device as claimed in claim 3, wherein the series arrangement of the voltage-dependent resistor and the PTC-resistor is connected in parallel with terminals of a mains voltage input.

5. A discrimination device as claimed in claim 3 wherein the thermally actuated switch is equipped with a bimetal strip.

6. A discrimination device as claimed in claim 5, wherein the voltage-dependent resistor and the PTC-resistor are arranged one on each side of a metal support on which the bimetal strip is arranged.

7. A device as claimed in claim 1, wherein the voltage-dependent resistor comprises a zener diode connected in series with a resistor.

8. A discrimination device as claimed in claim 4, wherein the thermally-actuated switch comprises a bimetal strip.

9. A discrimination device as claimed in claim 3, further comprising a pair of input terminals for an AC mains voltage, means coupling the series arrangement of the VDR and the PTC-resistor across said input terminals, and wherein the thermally-actuated switch includes a bimetal strip and the VDR and the PTC-resistor are arranged one on each side of a metal support on which the bimetal strip is arranged.

10. A discrimination device as claimed in claim 2, wherein the VDR comprises a zener diode connected in series with a resistor.

11. A discrimination device as claimed in claim 4, wherein the VDR comprises a zener diode connected in series with a resistor.

12. A discrimination device for coupling a load to a pair of input terminals for connection to a source of alternating voltage that can have a high or a low voltage level comprising, means connecting a positive temperature coefficient (PTC) resistor in series circuit with a voltage-dependent resistor (VDR) to said pair of input terminals, said VDR having a lower resistance for the high voltage level than for the low voltage level alternating voltage at the input terminals, said VDR and PTC resistors being mounted in close thermal coupling relationship to one another so that, for the high level voltage at the input terminals, initially the temperature of the PTC resistor is determined mainly by the power dissipation in the VDR, and voltage dropping impedance means coupled to said load and to said input terminals and controlled by at least one of said resistors so that a higher impedance is connected in series with the load at the high voltage level than at the low voltage level of an alternating voltage at the input terminals.

13. A device as claimed in claim 12 wherein the VDR and the PTC resistor are connected in series circuit with the load across the input terminals, and said voltage-dropping impedance means comprises a first impedance element connected in parallel with the VDR and in series with the PTC resistor and a second impedance element connected across a part of the series circuit including the VDR and the PTC resistor.

14. A device as claimed in claim 13 wherein said first and second impedance elements comprise first and second capacitors, respectively, and the load comprises a small motor.

15. A device as claimed in claim 12 wherein said voltage-dropping impedance means comprises, first and second impedance elements coupled in circuit between the input terminals and the load so as to adjust the load current, and a thermally actuated switch in close thermal contact with at least one of said resistors and responsive thereto so as to switch one of said impedance elements in or out of said circuit as a function of the voltage level of an alternating voltage at the input terminals.

16. A device as claimed in claim 15 wherein the first impedance element comprises a first capacitor connected in series with a load across the input terminals and the second impedance element comprises a second capacitor connected in a second series circuit with a switching contact of the thermally actuated switch, said second series circuit being connected in parallel with the first capacitor.

17. A device as claimed in claim 12 wherein said voltage-dropping impedance means comprises, a transformer having a primary winding coupled to the input terminals and a secondary winding coupled to the load via a thermally actuated switch in close thermal contact with at least one of said resistors and responsive thereto so as to switch a part of said secondary winding in or out of circuit with the load as a function of the voltage level of an alternating voltage at the input terminals.

18. A device as claimed in claim 12 wherein said VDR exhibits a sharp variation in resistance at a voltage level intermediate said high and low voltage level of an alternating voltage at the input terminals.

19. A discrimination device for coupling an electric load to a pair of input terminals adapted for connection to a source of voltage having first and second voltage levels with said second voltage level approximately twice that of the first voltage level, comprising: means connecting a positive temperature coefficient (PTC) resistor in series circuit with a voltage-dependent resistor (VDR) between the input terminals and the load, said VDR exhibiting a decrease in resistance at a voltage exceeding a given voltage level intermediate said first and second voltage levels, said VDR and PTC resistor having characteristics such that when the second voltage level appears at the input terminals, the VDR at least initially dissipates more power than the PTC resistor, said VDR and PTC resistors being mounted in close thermal coupling relationship to one another so that initially the temperature of the PTC resistor is determined mainly by the power dissipation in the VDR, said PTC resistor then heating up and increasing its resistance to limit current in the VDR whereby the power dissipation in the VDR decreases.

20. A device as claimed in claim 19 wherein the load comprises an AC motor of a shaving apparatus.

\* \* \* \* \*

UNITED STATES PATENT AND TRADEMARK OFFICE
CERTIFICATE OF CORRECTION

PATENT NO. : 4,546,305
DATED      : October 8, 1985
INVENTOR(S) : BERNARDUS H.A. GODDIJN (DECEASED)

It is certified that error appears in the above-identified patent and that said Letters Patent is hereby corrected as shown below:

Claim 2, line 5, change "arranged" to --connected--

Claim 18, line 3, change "level" (second occurrence) to --levels--

Signed and Sealed this

Eighth Day of July 1986

[SEAL]

Attest:

DONALD J. QUIGG

Attesting Officer

Commissioner of Patents and Trademarks